United States Patent [19]

Hosoya

[11] 4,208,705
[45] Jun. 17, 1980

[54] SWITCHING REGULATED POWER SUPPLY APPARATUS

[75] Inventor: Nobukazu Hosoya, Higashiosaka, Japan

[73] Assignee: Sanyo Electric Co., Ltd., Osaka, Japan

[21] Appl. No.: 920,820

[22] Filed: Jun. 30, 1978

Related U.S. Application Data

[63] Continuation of Ser. No. 750,710, Dec. 15, 1976, abandoned.

[30] Foreign Application Priority Data

Dec. 15, 1975 [JP] Japan .............................. 50-149889
Dec. 17, 1975 [JP] Japan ........................ 50-172310[U]

[51] Int. Cl.$^2$ .................................................. H02M 3/335
[52] U.S. Cl. ........................................ 363/19; 323/9; 323/DIG. 1; 363/49; 363/56
[58] Field of Search ................... 323/9, 17, DIG. 1; 331/112; 358/190; 363/18, 19, 20, 21, 49, 56, 97, 131

[56] References Cited

U.S. PATENT DOCUMENTS

| | | | |
|---|---|---|---|
| 3,134,940 | 5/1964 | Massey et al. | 363/19 |
| 3,523,235 | 8/1970 | Schaefer | 363/19 |
| 3,629,686 | 12/1971 | Hetterscheid et al. | 323/DIG. 1 |
| 3,742,371 | 6/1973 | Seibt et al. | 323/DIG. 1 |
| 3,814,851 | 6/1974 | Nakagawa et al. | 323/DIG. 1 |
| 3,816,809 | 6/1974 | Kuster | 363/97 |
| 3,819,986 | 6/1974 | Fukuoka | 323/DIG. 1 |
| 3,889,173 | 6/1975 | Klusman et al. | 323/DIG. 1 |
| 3,943,425 | 3/1976 | Kupka et al. | 363/19 |
| 4,007,413 | 2/1977 | Fisher et al. | 363/18 |
| 4,034,281 | 7/1977 | Morita et al. | 323/DIG. 1 |

*Primary Examiner*—A. D. Pellinen
*Attorney, Agent, or Firm*—Armstrong, Nikaido, Marmelstein & Kubovcik

[57] ABSTRACT

A switching regulated constant voltage power supply apparatus, wherein a direct current voltage obtained through rectification and smoothing of a commercial alternate current power supply input is applied to a direct current/alternate current converting circuit implemented by a blocking oscillator such that the oscillator makes self oscillation upon turning on of the commercial alternate current power supply to provide an output from the converting circuit, the oscillator is adapted to operate in synchronism with the output from a driver circuit which is energized with the output from the converting circuit, and an error detecter is provided to detect an error fluctuation after rectification and smoothing of the output voltage from the converting circuit such that the detected output controls the converting circuit, thereby to provide a direct current constant voltage.

6 Claims, 3 Drawing Figures

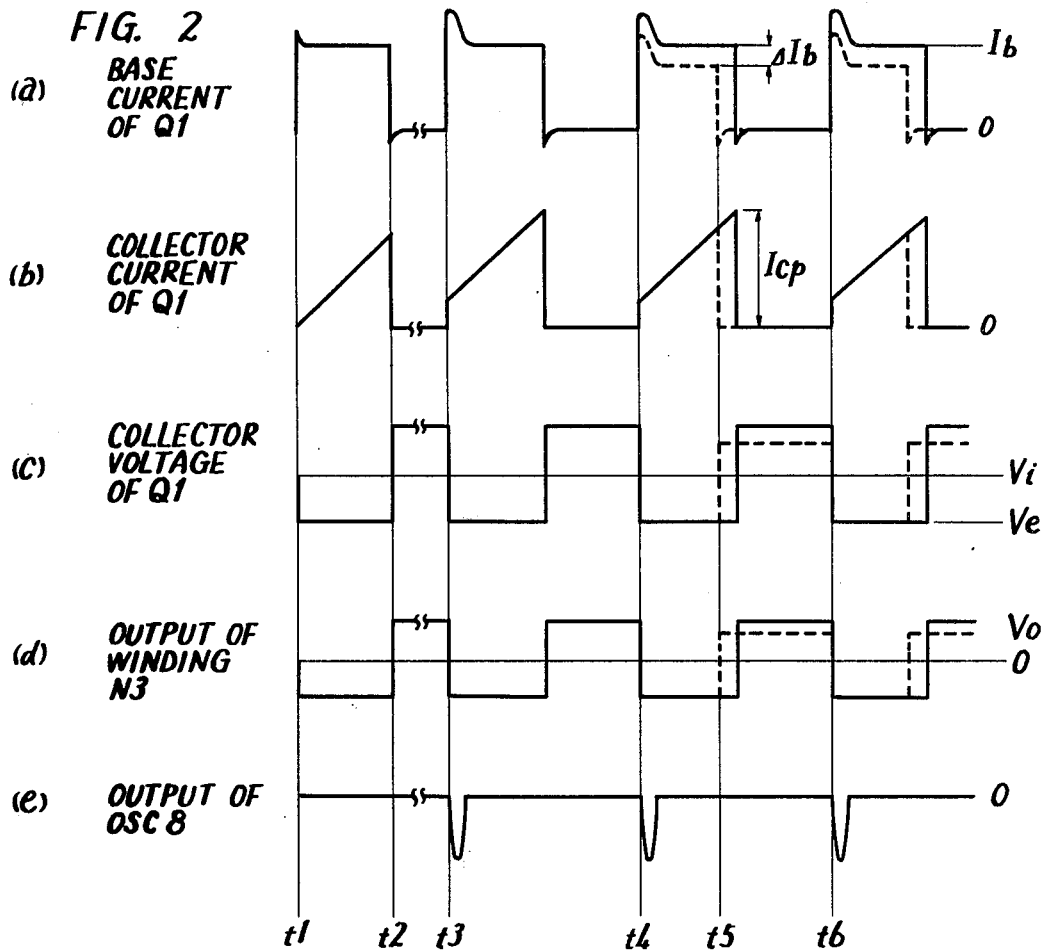
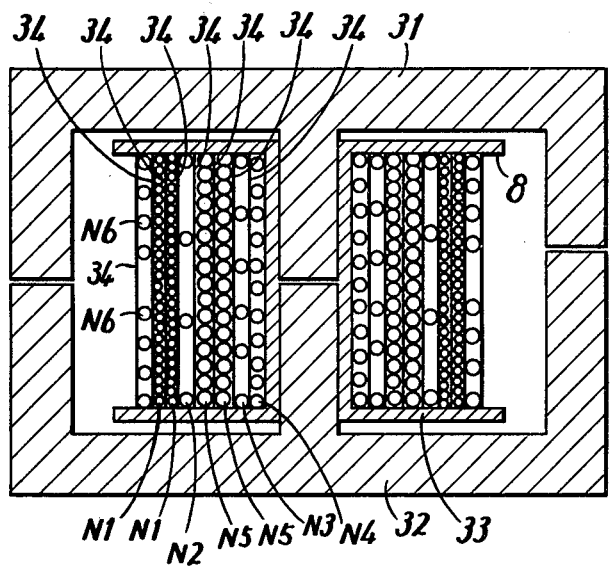

SWITCHING REGULATED POWER SUPPLY APPARATUS

This is a continuation of application Ser. No. 750,710, filed Dec. 15, 1976, now abandoned.

BACKGROUND OF THE INVENTION

1. Field of the Invention

The present invention relates to a switching regulated power supply apparatus. More specifically, the present invention relates to an improved switching regulated power supply apparatus wherein a direct current voltage obtained through rectification and smoothing of a commercial alternate current power supply input is applied to a direct current/alternate current converting circuit implemented by a switching device to convert the said direct current voltage into an alternate current voltage such that the ratio of the on and off time periods of the said switching device is controlled, whereupon the converted alternate current output is rectified and smoothed to provide a direct current constant voltage.

2. Description of the Prior Art

A variety of types of switching regulated power supply apparatuses were proposed and put into practical use. Such switching regulated power supply apparatuses may be classified depending on the type of the direct current/alternate current converting circuit, a driving system of the switching device, a circuit configuration of the constant voltage control, and the like. In particular, such switching regulated power supply apparatuses may be classified into an externally excited driving system and self excited driving system from the stand point of the above described driving system of the switching device. More specifically, the externally excited driving system may be defined as a switching regulated power supply apparatus wherein a switching device in a direct current/alternate current converting circuit for on/off controlling the input voltage supplied thereto is adapted to be driven in response to an output from an external oscillator, and a self excited driving system may be defined as a switching regulated power supply apparatus wherein a self running oscillator is formed to trigger the switching device so that the switching device does not require any external triggering signal.

The externally excited switching regulated power supply apparatus has advantages that the above described switching device may be of a type of a small peak current and a converter transformer to be connected to the switching device may be small sized. Nevertheless, this type of switching regulated power supply apparatus requires a transformer coupled driver circuit provided between the above described external oscillator and the switching device, which driver circuit usually comprises a control circuit for controlling the ratio of the on and off time periods of the switching operation. As a result, the type of the control circuit is restricted and the number of components as a whole in the power supply apparatus is increased, which makes the circuit configuration of the apparatus complicated. In addition, the external oscillator need be directly driven with the commercial alternate current power supply input at least at the start of the operation, which causes an increased power loss at the start of operation.

On the other hand, the self excited switching regulated power supply apparatus can be dispensed with an external oscillator and a driver circuit, which makes the circuit configuration of the apparatus simple and reduce the power loss at the start of operation. Nevertheless, this type of the switching regulated power supply apparatus has shortcomings that the switching frequency of the switching device is liable to vary depending on fluctuation of the power supply input and the load to cause an unstabilized constant voltage operation and a switching device of a large peak current must be used.

From the stand point of safety to the users and service engineers of the laws and rules in some countries in the world impose a strict requirement in connection with insulation of electrical machines and in particular complete insulation of a built-in power supply apparatus at the output side thereof from the commercial power source line. Nevertheless, the prior art switching regulated power supply apparatus involves the above described advantages and disadvantages depending upon which type is employed, a self excited driving system or externally excited driving system. Therefore, taking into consideration the insulation between the input and output of the power supply apparatus, selection of a self excited driving system or externally excited driving system is of a great problem in designing a switching regulated power supply apparatus.

The present invention was accomplished for the purpose of eliminating the above discussed problems encountered in conjunction with the prior art switching regulated power supply apparatus.

SUMMARY OF THE INVENTION

Briefly described, the present invention comprises a switching regulated power supply apparatus wherein a direct current voltage obtained through rectification and smoothing of an alternate current input from a commercial alternate current power supply is applied to a direct current/alternate current converting circuit implemented by a blocking oscillator such that said blocking oscillator makes self excited oscillation upon turning on of said commercial alternate current power supply to provide an output from said converting circuit, said blocking oscillator is adapted to operate in synchronism with the output from a driver circuit which is energized with the output from said converting circuit, and an error detector is provided to detect an error fluctuation of the output voltage, as rectified and smoothed, from said converting circuit whereupon said converting circuit is controlled with said detected output, thereby to provide a direct current constant voltage.

Therefore, a principal object of the present invention is to provide a switching regulated power supply apparatus adapted to make stabilizer operation with respect to fluctuation of the power supply input and the load of the apparatus.

Another object of the present invention is to provide a switching regulated power supply apparatus of a decreased power loss at the start of operation.

A further object of the present invention is to provide a switching regulated power supply apparatus achieving complete insulation between the input and the output of the apparatus.

Still a further object of the present invention is to provide a switching regulated power supply apparatus insuring safety with respect to the overload and damages at portions of the apparatus.

It is a further object of the present invention to provide a switching regulated power supply apparatus capable of being implemented with a less number of components in a simple circuit configuration at an inexpensive cost.

It is still a further object of the present invention to provide a switching regulated power supply apparatus particularly suited for a power supply apparatus of a television receiver.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows wave forms of the signals at various portions in the FIG. 1 embodiment; and FIG. 3 shows a sectional view of a converter transformer employed in the FIG. 1 embodiment.

DESCRIPTION OF THE PREFERRED EMBODIMENTS

Figure 1:
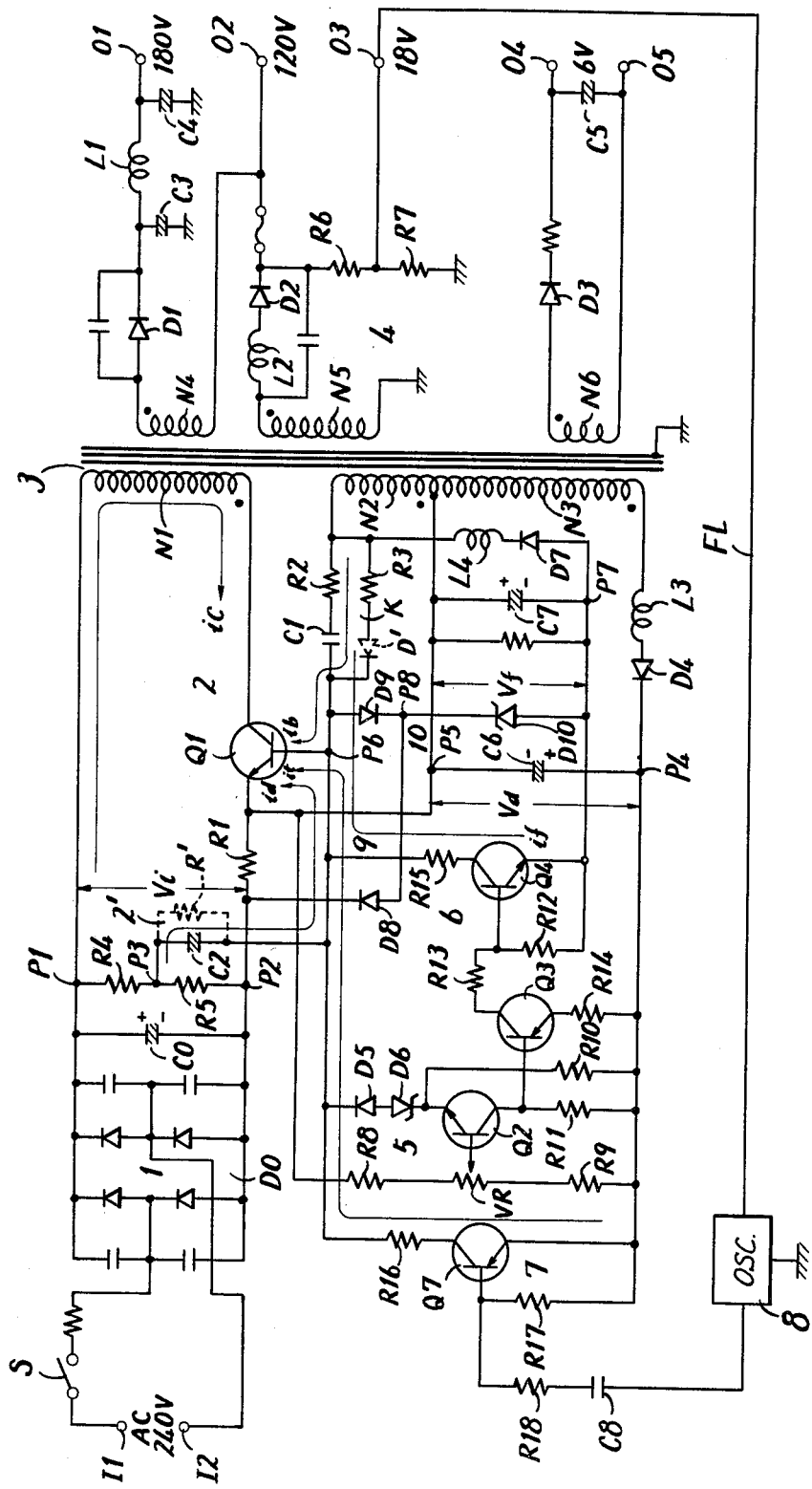
FIG. 1 shows a schematic diagram of one embodiment of the inventive switching regulated power supply apparatus.

Referring to FIG. 1, the embodiment shown basically comprises an input rectifier 1 for rectifying the input from the commercial alternate current power supply and smoothing the rectified output, a direct current/alternate current converter 2 comprising a switching transistor for repetitively on/off controlling the output from the input recitifier 1 and a converter transformer being supplied with the switching output, an output rectifier 4 for rectifying the converted alternate current output and smoothing the rectified output for providing a direct current output voltage, an error detector 5 for detecting fluctuation of the output from the said direct current/alternate current converter for amplifying the detected output, a control circuit 6 for controlling the ratio of the on and off time periods of the said switching transistor in response to the output from the error detector 5, a driver 7 for synchronously driving the switching transistor at a predetermined repetitive frequency, an over current preventing circuit 9 for preventing the switching output current from overly increasing due to a diversified current amplification factor of the switching transistor, and an over voltage preventing circuit 10 for preventing the direct current output voltage from overly increasing due to the disorder of the error detector 5 or the control circuit 6.

The input rectifier 1 is connected to receive the commercial alternate current power supply input AC through a power switch S from a pair of input terminals I1 and I2 and is implemented by a bridge connected rectifying circuit Do, which is followed by a smoothing circuit implemented by a capacitor Co of a large capacity. Since detailed connection and operation of such an input rectifier are well known to those skilled in the art, detailed description thereof is omitted.

The direct current/alternate current converter 2 comprises a converter transformer 3, which comprises an input winding N1, a feedback winding N2, a detection winding N3 and first, second and third output windings N4, N5 and N6, each coupled to the transformer with the polarity as shown. Referring to FIG. 3, the converter transformer 3 comprises two E shaped magnetic cores 31 and 32 provided face to face to form a closed magnetic circuit, wherein a bobbin 33 made of synthesized resin is inserted to the central magnetic pole and the above described windings are wound in order in a layered manner with insulation tapes 34 interposed therebetween.

The direct current/alternate current converter 2 basically conprises a blocking oscillator implemented by the above described input winding N1, feedback winding N2 and a switching transistor Q1. More specifically, a series connection of the switching transistor Q1 through the emitter and collector electrodes thereof, the input winding N1 and an over current detecting resister R1 to be described subsequently is connected between the output terminals P1 and P2 of the input rectifier 1, while one end of the feedback winding N2 is coupled to the base electrode of the switching transistor Q1 through an impedance circuit K comprising a parallel connection of series connected capacitor C1 and resistor R2 and a resistor R3 and the other end of the feedback winding N2 is directly connected to the emitter electrode of the switching transistor Q1.

The converter 2 further comprises a starting circuit 2' implemented by a capacitor C2 connected beween the base electrode of the switching transistor Q1 and a junction P3 of voltage dividing resistors R4 and R5 connected between the output terminals P1 and P2 of the input rectifier 1. The above described capacitor C2 of the starting circuit 2' may be replaced by a resistor R' shown by a dotted line in the figure, in which event a diode D' shown in a dotted line is preferably inserted in series with the resistor R3 in the impedance circuit K for the purpose of blocking a current flowing through the resistor R' to the feedback winding N2.

The output rectifier 4 comprises rectifying diodes D1, D2 and D3 each coupled to the first, second and third output windings N4, N5 and N6, respectively, of the converter transformer 3, smoothing capacitors C3, C4 and C5 coupled to the diodes D1 and D3, choke coils L1 and L2 coupled to the diodes D1 and D2, respectively, and voltage dividing resistors R6 and R7 coupled to the diode D2. Thus, it is appreciated that the output rectifier 4 comprises three output rectifier portions, each specifically designed to provide a different output voltage. Since such circuit configuration and operation thereof are well known to those skilled in the art, more detailed description is omitted.

The error detector 5 comprises a series connection of a capacitor C6, a diode D4 and a choke coil L3 coupled to the detection winding N3 connected in series with the feedback winding N2, provided for the purpose of rectifiying and smoothing the voltage across the detection winding N3, a potential divider implemented by a series connection of resistors R8 and R9 and a variable resistor VR for dividing a direct current voltage Vd developed between the points P4 and P5 at the opposite ends of the capacitor C6, and a comparator implemented by a transistor Q2 connected to receive the above described divided voltage at the base electrode thereof and to receive a reference voltage at the emitter electrode thereof which is obtained by means of a series connection of a diode D5, Zener diode D6 and a resistor R10 connected between the above described point P4 and the base electrode of the switching transistor Q1, i.e. the point P6. The collector electrode of the transistor Q2 is connected through a resistor R11 to the point P4 serving as a collector load resistor.

The control circuit 6 comprises a transistor Q3 which is connected, at the emitter and collector electrodes thereof, in series with resistors R12, R13 and R14 between the hot point P4 of the above described voltage Vd and the cold point P7 of a direct current voltage Vf obtained through rectification and smoothing of the voltage across the feedback winding N2 by means of a diode D7 and a capacitor C7 so as to amplify and invert the output from the transistor Q2, and another transistor Q4 connected, at the collector and emitter electrodes thereof, between the points P6 and P7 through a resistor R15 so as to be controllable in response to the output from the transistor Q3.

The driver circuit 7 comprises a driver transistor Q7 connected, at the emitter and collector electrodes thereof, between the points P4 and P6 through a resistor R16 so as to be switch controllable responsive to the output from an oscillator 8 oscillating at a predetermined oscillation frequency of about several tens kHz, preferably a horizontal oscillator of a television receiver, which is energized by the output from the output rectifier 4 through a line FL. The base electrode of the transistor Q7 is connected through a base bias resistor R17 to the point P4 and also through a coupling connection of a resistor R18 and a capacitor C8 to the oscillator 8.

The over current preventing circuit 9 comprises an over current detecting resistor R1 connected between the emitter electrode of the switching transistor Q1 and the point P2, and a series connection of diodes D8 and D9 connected between the point P2 and the base electrode P6 of the transistor Q1. The over voltage preventing circuit 10 comprises the above described diodes D8 and D9, and a Zener diode D10 connected between the junction P8 of the diodes D8 and D9 and the point P7.

Since the circuit configuration of the inventive switching regulated power supply apparatus was described in the foregoing with reference to FIG. 1, the operation of the FIG. 1 embodiment will be described in the following with simultaneous reference to the wave forms shown in FIG. 2. In the following, at the outset the operation from the start toward the steady state of the apparatus will be described, and then the operation of the constant voltage control will be described, and thereafter the function of the over current and over voltage preventing circuits will be described.

(1) Operation from the Start toward the Steady State

The operation of the apparatus from the start toward the steady state thereof will first be described with reference to the wave forms shown in solid lines in FIG. 2. Assuming that the power switch S is closed at the timing t=t1, the starting current id flows from the point P3 of the input rectifier 1 through the capacitor C2 to the base electrode of the switching transistor Q1, and accordingly the collector current ic of the transistor flows from the rectifier 1 to the input winding N1, thereby to induce a voltage across the feedback winding N2. The voltage is induced in such a direction as to give rise to a positive feedback to the transistor Q1, so that a feedback current ib flows from the feedback winding N2 through the impedance circuit K to the base electrode of the transistor Q1. The above described succession of the operations occur within an extremely short time period after the power switch S is closed, and accordingly the base current of the transistor Q1 reaches instantaneously the peak value shown in FIG. 2(a), whereupon a constant magnitude Ib determinable by the impedance of the impedance circuit K is maintained. On the other hand, the collector current ic of the transistor Q1 does not increase so rapidly due to the inductance of the input winding N1, so that the collector current ic increases approximately linearly as shown in FIG. 2(b), while the base current is kept to the constant value Ib. Therefore, when the collector current ic reaches the magnitude Icp as large as $\beta$ times the base current Ib where $\beta$ is a current amplification factor of the transistor Q1, it becomes impossible for the transistor Q1 to remain on, with the result that the transistor Q1 is rapidly turned off at the timing t=t2.

When the transistor Q1 is turned off, the energy stored in the input winding N1 during the on time period t1~t2 is dissipated and accordingly the collector potential of the transistor Q1 so far kept in approximately the emitter potential Ve rapidly increases at the timing t=t2 as shown in FIG. 2(c). As a result, a voltage is developed at each of the first, second and third output windings N4, N5 and N6. The voltage developed in the second output winding N5 is rectified and smoothed by means of the diode D2 and voltage dividing resistors R6 and R7 in the output rectifier 4 to provide a positive output voltage at the output terminal 03. The said positive voltage is supplied to the oscillator 8 through the line FL, as described previously.

Since the oscillator 8 is supplied with the above described positive voltage, the oscillator 8 starts to oscillate, thereby to provide an output pulse of a predetermined interval at the timing t=t3 as shown in FIG. 2(e), which pulse e is applied to the base electrode of the transistor Q7. Upon application of the pulse e to the transistor Q7, the transistor Q7 is turned on and the collector current it flows through the resistor R16 and through the base/emitter junction of the switching transistor Q1. Accordingly, this time the collector current ic of the transistor Q1 due to the said base current it flows through the input winding N1 as described previously, so that the transistor Q1 is again turned on. As a result, the same operation as that of the above described time period t1~t3 is repeated thereafter, with the result that the switching transistor Q1 reaches a steady state where the switching transistor Q1 is repetitively turned on and off in synchronism with the said pulse e.

Accordingly, after the timing t=t3, the voltage of the first output winding N4 varies in a rectangle wave form and the voltages at the second and third output windings N5 and N6 similarly vary. These voltages at the output windings are peak rectified by means of the diodes D1, D2 and D3 and the capacitors C3, C4 and C5 of the output rectifier 4 and the rectified outputs are withdrawn, directly or through voltage division or after addition, by way of a variety of direct current output voltages as shown in the figure, through the output terminals O1 through O4.

The peak value Von (n=4, 5 and 6) of the rectangle wave form voltage developed at the first, second and third output windings N4, N5 and N6 is determined in the following equation:

$$Von = Tn \cdot Vi$$

where Tn (N=4,5 and 6) is the respective turn ratio of each of the output windings N4, N5 and N6 with respect to the input winding N1, and Vi is the direct current voltage between the points P1 and P2.

Although the above described pulse e does not necessarily occur during the first off time period of the switching transistor Q1, the oscillation frequency of the blocking oscillator implemented by the said transistor Q1 and the converter transformer 3 is preferably selected to be slightly lower than that of the oscillator 8, in which event the pulse e is generated while the transistor is on and off controlled several times through self oscillation after turning on of the power switch S, with the result that the transistor Q1 comes to be driven in synchronism with the pulse e.

(2) Constant Voltage Operation

Now a constant voltage operation will be described with reference to the wave forms as shown in dotted lines in FIG. 2.

Now assuming that the direct current output voltages from the output terminals 01~04 increase, the rectangle wave form voltages at the output windings must have changed and the rectangle wave form voltage developed in the detecting winding N3 changes as shown in FIG. 2(d) accordingly and therefore the direct current voltage Vd between the points P4 and P5 increases accordingly. Since the base potential of the transistor Q2 at the above described steady state has been selected to be slightly higher than the sum of the emitter potential of the transistor Q2 and the rise voltage across the emitter/base of the transistor Q2, if and when the base potential of the transistor Q2 increases at the timing t=t4 because of the increase of the said voltage Vd, the collector current of the transistor Q2 accordingly increases, with the result that the voltage across the resistor R11 increases, which voltage increase is amplified and inverted by the transistor Q3 to be applied to the base electrode of the transistor Q4. In other words, the control circuit 6 operates such that as the base potential of the transistor Q2 increases the forward bias across the base/emitter junction of the transistor Q4 increases. Accordingly the current if flowing from the upper end of the feedback winding N2 through the impedance circuit K, resistor R15, and the collector/emitter of the transistor Q4 toward the point P7 increases.

An increase in the current if means a decrease in the feedback current ib flowing from the upper end of the feedback winding N2 toward the base electrode of the transistor Q1. In other words, a portion of the current ib is shunted by the transistor Q4. When the feedback current ib decreases by Δib as shown in FIG. 2(a), the collector current ic of the transistor Q1 cannot exceed the value β times the current ib, with the result that the on time period of the transistor Q1 becomes shorter as t4~t5 shown in FIG. 2(b). As the on time period of the transistor Q1 becomes shorter, the energy stored in the input winding N1 during the on time period t4~t5 decreases, so that the collector potential during the off time period t5~t6 of the transistor Q1 becomes lower as shown in dotted line in FIG. 2(c). Accordingly, the rectangle wave form voltage developed during the off time period at the first, second and third output windings N4, N5 and N6 decreases accordingly, so that an increase of the direct current output voltages withdrawn from the output terminals 01 thorugh 04 is suppressed. On the contrary, assuming that the direct current output voltage becomes lower, the apparatus functions contrary to the above, thereby to prevent a decresase of the voltage, thereby to perform a stabilizing operation.

(3) Operation of Over Current and Over Voltage Preventing Circuits

Finally, the operation of the over current preventing circuit 9 and the over voltage preventing circuit 10 will be described in the following.

From the foregoing description it became apparent that the on time period of the switching transistor Q1 is determinable by the current amplification factor β of the transistor. This means that the constant voltage operation range is different depending on a diversified current amplification factor β. The over current protecting circuit 9 is provided to limit the collector current ic of the switching transistor Q1 to less than a predetermined value, thereby to achieve a predetermined constant voltage operation range irrespective of a diversified current amplification factor β of the transistor Q1. More specifically, assuming that the current amplification factor β of the switching transistor Q1 is larger than the required value so that the peak value of the collector current ic of the transistor Q1 exceeds the collector current Icp shown in FIG. 2(b), the diodes D8 and D9 both become conductive if and when the sum of the voltage developed across the over current detecting resistor R1 and the voltage VBE between the base electrode and the emitter electrode of the switching transistor Q1 exceeds the sum of the rise voltages of the diodes D8 and D9 due to an increase in the collector current ic and thus an increase in the emitter current of the switching transistor Q1, thereby to shunt the feedback current from the feedback winding N3 to the base electrode of the switching transistor Q1, thereby to limit the collector current of the transistor Q1, with the result that the direct current output voltage is kept constant.

On the other hand, the over voltage protecting circuit 10 is provided to prevent an increase in the direct current output voltage which might be caused by an inoperative state of the constant voltage control function which might occur if and when at least one of the transistors Q2, Q3 and Q4 is damaged to be open and the principle of the over voltage protecting circuit 10 is similar to that of the above described over current protecting circuit 9. More specifically, if and when the direct current voltage between the points P6 and P7 exceeds sum of Zener voltage of the Zener diode D10 and the rise voltage of the diode D9, the Zener diode D10 and the diode D9 become conductive, thereby to shunt the feedback current ib from the feedback winding N2 to the base electrode of the switching transistor Q1, whereby the collector current ic of the transistor is restricted.

Now returning to FIG. 3, further description will be made of the converter transformer shown in FIG. 3. In providing various windings in this type of converter transformer, there are various restrictions for the respective windings. As a result of research of the converter transformer by the inventor, the following were observed.

(1) The impedance of the output windings is preferably selected to be larger, insofar as the internal impedance of the entire power supply apparatus may be relatively small and an oscillation frequency not causing a beat noise of the transformer can be obtained, whereby the current capacity of the switching device, an alternate current loss of the transformer and undesired radiation are made small as much as possible.

(2) A ripple voltage caused by a current resulting from outside the power supply apparatus is preferably suppressed by selecting a smaller direct current resistance of the output windings.

(3) Coupling between the input winding and the output windings and between the input winding and the feedback winding is preferably selected to be larger, so that the switching device may operate well within the stabilized operation range, while the power loss is kept less.

(4) Coupling between the output windings and the detection winding is preferably selected to be larger, thereby to improve a voltage stability of the output voltage, while the internal impedance of the apparatus is made small.

(5) Coupling between the input winding and the detection winding is preferably made small, so that influence of the ringing to the detection winding may be made small.

Hence, it is desired to provide an improved converter transformer that can satisfy the above described requirements. In the following, description will be made of such an improved converter transformer. Referring to FIG. 3, the reference character N1 denotes the input winding, the reference character N4 denotes the first output winding, the reference character N5 denotes the second output winding to be connected in series with the first output winding, and the reference characters N6 denotes other output windings. The reference character N2 denotes the feedback winding, and the reference character N3 denotes the detection winding.

In the inventive converter transformer, the output windings are divided into the first output winding N4 and the second output winding N5, while all the above described windings including the first and second output windings N4 and N5 are wound in succession in a layered manner on the same magnetic pole of the core. More specifically, referring to FIG. 3, the reference numeral 33 denotes a bobbin provided around the central magnetic pole of the core of the closed magnetic circuit implemented by face to face combination of two E shaped cores. At first, the first output winding N4 is wound on the bobbin, and then the detection winding N3 is wound thereon with the insulation tape 34 interposed therebetween and thereafter the second output winding N5, the feedback winding N2, the input winding N1, and the low voltage windings N6 are in succession wound thereon with the insulation tapes 13 interposed therebetween. In winding these windings, the input winding N1 and the second output winding N5 of a relatively large number of turns are wound closely and in a layered manner, while other windings N4, N6, N2 and N3 of a less number of turns are space wound such that these windings are distributed throughout the length of the magnetic pole, thereby to enhance the degree of coupling.

According to the inventive converter transformer of such structure, (1) since the output windings are wound in the vicinity of the magnetic pole where the diameter of the windings is small, the inductance thereof can be selected to be larger, while the direct current resistance thereof may be made small, and (2) since the output windings have been divided into two, the coupling between the input and output windings and between the output and detection windings can be selected to be larger, while the coupling between the input and detection windings may be made small. These characteristics are particularly advantageous to a converter transformer to be employed in the inventive switching regulated power supply apparatus.

EPILOGUE

As described in the foregoing, the inventive switching regulated power supply apparatus has adopted novel operation principles in the direct current/alternate current converter and the constant voltage control, and in addition skillful combination of the protecting circuits with the error detector and the driver. As a result, various objects, aspects, features and advantages discussed previously can be achieved.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. A switching regulated power supply apparatus, comprising:
   input rectifying means to be coupled to a commercial alternate current power supply for rectifying the commercial alternate current input to provide a rectified output;
   direct current/alternate current coverting means coupled to said input rectifying means for repetitively on/off controlling said rectified output for providing an on/off controlled output, said direct current/alternate current converting means comprising blocking oscillator means having switching device means comprising a switching transistor for on/off controlling said rectified output and transformer means comprising an input winding, a feedback winding and a detection winding for transforming said on/off controlled output, said input winding being connected to the collector of said switching transistor, and the feedback winding being connected between the base and emitter of said switching transistor,
   output rectifying means coupled to said direct current/alternate current converting means for rectifying said transformed output from said transformer means for providing a direct current output,
   reference direct current voltage source means for providing a reference direct current voltage,
   error detecting means coupled to said output rectifying means and said reference direct current voltage source means for comparing said direct current output with said reference direct cuttent voltage for detecting fluctuations of said direct current output,
   control means operatively coupled to said error detecting means and to the base of said switching transistor of said blocking oscillator means for controlling the ratio of the on and off time periods of said switching transistor as a function of the fluctuation detected output from said error detecting means, said control means including a bypass transistor means coupled to the base of said switching transistor for bypassing the base current to said switching transistor in response to the output of said error detecting means, wherein the emitter of said bypass transistor means is coupled to a negative voltage from said transformer means; and
   driver means operatively coupled to said switching transistor for on/off controlling said switching transistor at a predetermined time interval, said drive means including external synchronization oscillator means connected to be energized by said direct current output from said output rectifying means, said external synchronization oscillator means, and thereby said driver means controlling the on-time of said switching transistor,
   said blocking oscillator means being self-oscillated upon connection of said input rectifying means to a commercial alternate current power supply, whereby said switching transistor on/off controls said rectified output from said input rectifying means, and said driver means is energized by said direct current output from said output rectifying means, whereupon said blocking oscillator means is operatively in synchronism with the output from said driver means.

2. A switching regulated power supply apparatus in accordance with claim 1, which further comprises impedance device means coupled between the output from said input rectifying means and said control electrode of said switching transistor means for supplying a starting current to said blocking oscillator means upon connection of said input rectifying means to a commercial alternate current power supply.

3. A switching regulated power supply apparatus in accordance with claim 1, wherein said error detecting means comprises
rectifying means coupled to said detection winding of said converter transformer means for rectifying the output voltage from said detection winding,
reference direct current voltage source means for providing a reference direct current voltage, and
means coupled to said rectifying means and said reference direct current voltage source means for comparing said rectified output from said rectifying means with said reference direct current voltage.

4. A switching regulated power supply apparatus in accordance with claim 3, wherein said driver means comprises rectangle wave form oscillator means being operative upon application of said direct current output from said output rectifying means for providing a rectangle wave form output, and drive transistor means coupled between the output from said rectifying means coupled to said detection winding and said control electrode of said switching transistor means and operatively coupled to said rectangle wave form oscillator means to be switched in response to the rectangle wave form output from said rectangle wave form oscillator means.

5. A switching regulated power supply apparatus in accordance with claim 1, which further comprises over current protecting means comprising over current detecting resistor means connected in series between said switching transistor means and said input rectifying means and diode means for operatively coupling the voltage across said over current detecting resistor means to said control electrode of said switching transistor means.

6. A switching regulated power supply apparatus in accordance with claim 5, wherein said diode means comprises a series connection of first and second diode means, and which further comprises over voltage protecting means comprising over voltage detecting means connected between the junction of said first and second diode means and the output of rectifying means coupled to said feedback winding of said converter transformer means.

* * * * *